(No Model.)
J. Q. PRIMM.
GATE.
No. 585,784. Patented July 6, 1897.
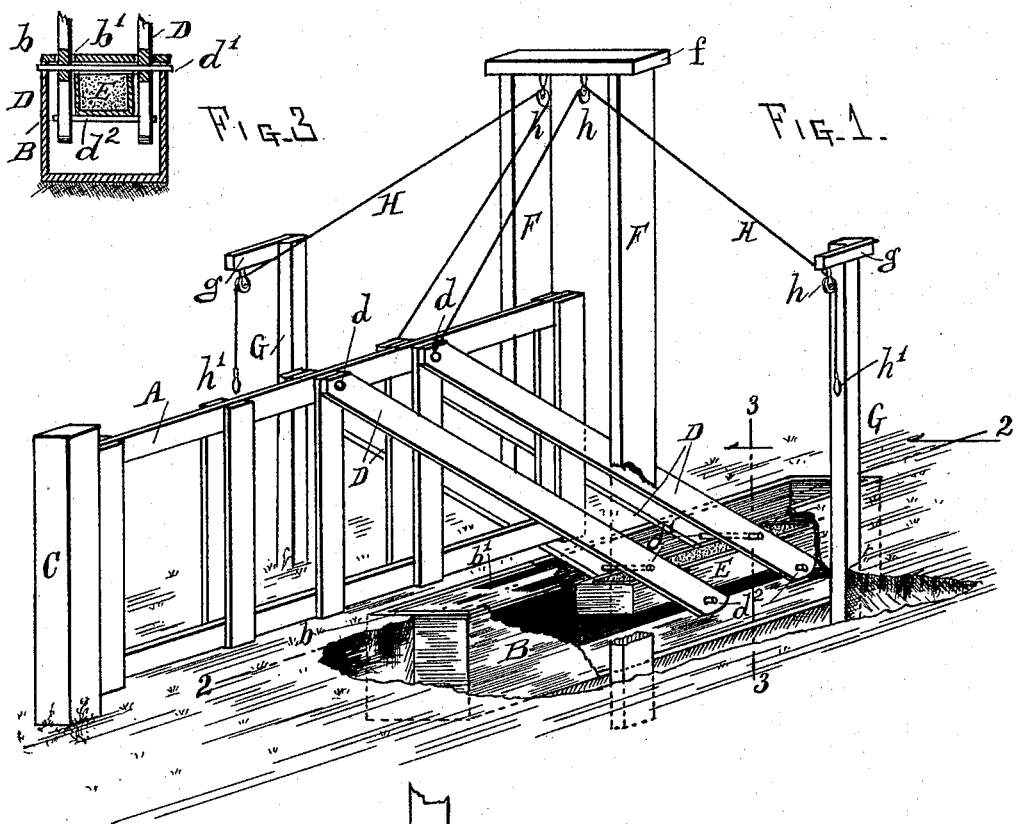
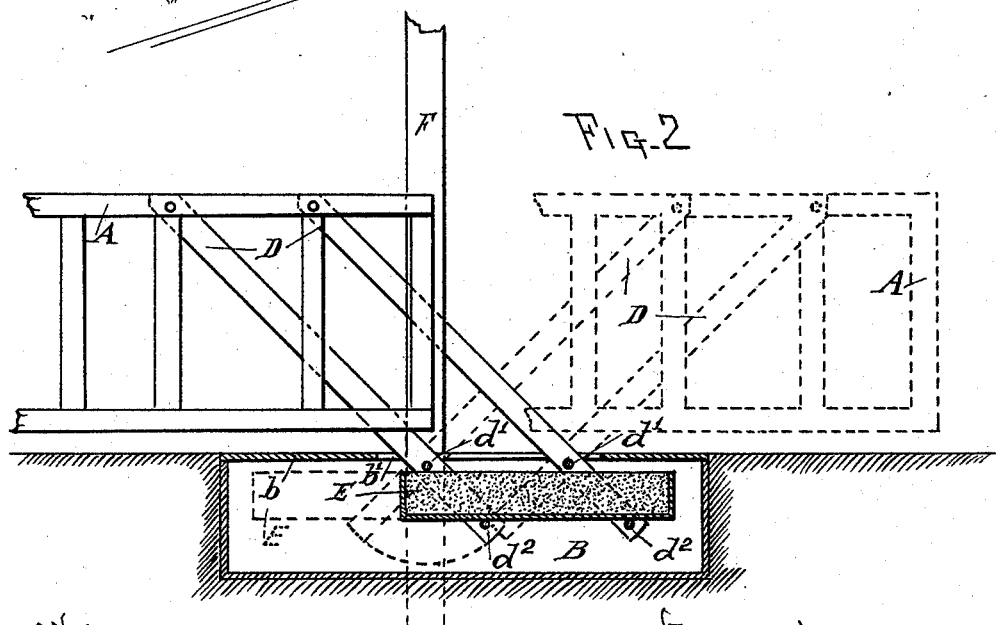
Witnesses.
A. D. DuBois.
Edwin F. Smith
Inventor.
JOHN Q. PRIMM.
By Atty N. DuBois.

UNITED STATES PATENT OFFICE.

JOHN Q. PRIMM, OF LOYD, ILLINOIS.

GATE.

SPECIFICATION forming part of Letters Patent No. 585,784, dated July 6, 1897.

Application filed February 5, 1897. Serial No. 622,169. (No model.)

*To all whom it may concern:*

Be it known that I, JOHN Q. PRIMM, a citizen of the United States, residing at Loyd, in the county of Menard and State of Illinois, have invented certain new and useful Improvements in Gates, of which the following is such a full, clear, and exact description as will enable those skilled in the art to which it appertains to make and use my said invention.

My invention relates to gates of that class known as "jump-gates"—that is, gates which are counterbalanced by weights and which are pivotally connected with supporting arms or levers operated by means of cords in such manner as to raise the gate and swing it inward when opening the gate and to raise the gate and swing it outward when closing the gate. A gate of this species is shown and described in United States Patent No. 236,673, granted to B. C. Cressy January 18, 1881. A common objection to gates of this kind is that the weights which serve to counterbalance the gate being above ground and in full view detract from the appearance of the gate, rendering it undesirable for use at the entrance to parks or other well-kept grounds. They are also objectionable because the movement of the weights is likely to distract and frighten timid horses which are already intently watching the moving gate in front of them.

The special purpose of my invention is to provide a gate having a counterbalancing-weight which is entirely concealed, thereby obviating the objections above stated.

My invention consists in certain novel features of construction and combinations of parts shown in the annexed drawings, to which reference is hereby made, and hereinafter particularly described and specifically claimed.

In the drawings, Figure 1 is a perspective view of the complete gate, a part of the ground, and one side of the box within which the lower ends of the arms and the counterbalancing-weight are contained being shown as broken away and the top of the box being also shown as broken away in order to more clearly illustrate the construction and arrangement of the inclosed parts. Fig. 2 is a vertical longitudinal section on the line 2 of Fig. 1 and shows in dotted lines the revolved position of the gate when it is swung open. Fig. 3 is a vertical transverse section through the box on the line 3 of Fig. 1.

Similar letters of reference designate like parts in all of the views.

The main frame A of the gate may be of any suitable material and may be constructed in any suitable and convenient form, and when closed the frame extends transversely across the roadway, and its outer end abuts against the gate-post C.

Vertical posts F are planted in the ground parallel to each other in such position that when the gate is closed the inner end of the frame A will lie midway between said posts and at such distances apart as to permit the arms D to swing freely between said posts.

The box B is planted in the ground between the posts F and extends lengthwise partly under the frame A. The box B has a top $b$, having slots $b'$, in which the arms D travel. When the box B is in position, its top is flush with the upper surface of the roadway.

Arms D have their upper ends pivotally connected with the frame A by bolts $d$, and these arms are supported and turn on bolts $d'$, which pass transversely through the sides of the box B and through the arms D.

Bolts $d^2$ pass through each pair of arms D near their lower ends. These bolts are shorter than the internal transverse width of the box B in order that the lower ends of the arms may swing freely within the box without the ends of the bolts rubbing on or binding against the sides of the box.

The counterbalancing-weight preferably consists of a box E, supported on the bolts $d^2$ and containing a suitable quantity of sand or other heavy material, though any other suitable weight may be used. When the arms D are turned on the bolts $d'$, the sand-box E moves longitudinally within the box B, as indicated by dotted lines in Fig. 2.

The posts G are placed at suitable distances on opposite sides of the gate-frame and approximately in line with the inner end thereof.

The gate is operated in the usual well-known manner by means of cords H, connected with the frame A and passing over pulleys $h$, connected with the cross-piece $f$ on the posts F and the arms $g$ on the posts G. When the gate is closed, the frame A, the arms D, and the sand-box E occupy the relative positions shown by full lines in Fig. 2, and when the gate is opened by pulling on one of the cords H the same parts occupy the positions indicated by dotted lines in Fig. 2.

I am aware that counterbalanced swinging arms supporting the gate-frame have heretofore been used. I therefore do not claim that feature broadly.

What I claim as new, and desire to secure by Letters Patent, is—

In a gate, the combination of a box having a slotted top flush with the surface of the roadway, bolts passing transversely through said box, parallel arms supported in pairs on said bolts and swinging in the slots in the top of said box, bolts passing transversely through each pair of said arms near their lower ends, a sand-box supported on said last-named bolts, and a gate-frame pivotally connected with said arms, as set forth.

In witness whereof I have hereunto subscribed my name, at Loyd, Menard county, Illinois, this 15th day of December, 1896, in the presence of two witnesses.

JOHN Q. PRIMM.

Witnesses:
   CHAS. J. HUTCHERSON,
   SAML. MONTGOMERY.